United States Patent [19]

Itaba

[11] Patent Number: 5,029,096
[45] Date of Patent: Jul. 2, 1991

[54] CURVED SURFACE FORMING SYSTEM

[75] Inventor: Tetsu Itaba, Aichi, Japan

[73] Assignee: Mitsubishi Denki K.K., Tokyo, Japan

[21] Appl. No.: 371,787

[22] Filed: Jun. 21, 1989

[30] Foreign Application Priority Data

Jun. 21, 1988 [JP] Japan .................. 63-152531

[51] Int. Cl.$^5$ .............................. G06F 15/46
[52] U.S. Cl. ................... 364/474.29; 364/191
[58] Field of Search ............ 364/474.24, 474.26, 364/474.29, 191, 521, 522, 518, 474.23

[56] References Cited

U.S. PATENT DOCUMENTS 4,791,581 12/1988 Ohba ........................... 364/521
4,868,761 9/1989 Hayashi ..................... 364/474.24
4,870,597 9/1989 Seki et al. .................. 364/474.29

OTHER PUBLICATIONS

Kikai Gijutsu (Mechanical Technology), vol. 35, No. 13, pp. 105–106, Oct. 1987.

Primary Examiner—Jerry Smith
Assistant Examiner—Paul Gordon
Attorney, Agent, or Firm—Sughrue, Mion, Zinn, Macpeak & Seas

[57] ABSTRACT

A curved surface forming system for forming a curved surface which is constituted by a plurality of curves and represented by two curved surface parameters, comprising an inputting unit for inputting the plurality of curves, a judging unit for determining a definition direction, a data storing unit for storing a direction data representing the definition direction, a curve consulting unit for consulting the curve in the opposite direction, and a curved surface forming unit for forming a curved surface.

6 Claims, 4 Drawing Sheets

FIG. 8(a)
| A₁ | FWD |
|---|---|
| A₂ | FWD |
| B₁ | REV |
| B₂ | FWD |
|  |  |
FIG. 8(b)
| PASSING POINT | TANGENTIAL VECTOR | CURVE PARAMETER |
|---|---|---|
| $P_1$ | $V_1$ | $t_1$ |
| $P_2$ | $V_2$ | $t_2$ |
| ⋮ | ⋮ | ⋮ |
| $P_i$ | $V_i$ | $t_i$ |
| ⋮ | ⋮ | ⋮ |
FIG. 8(c)
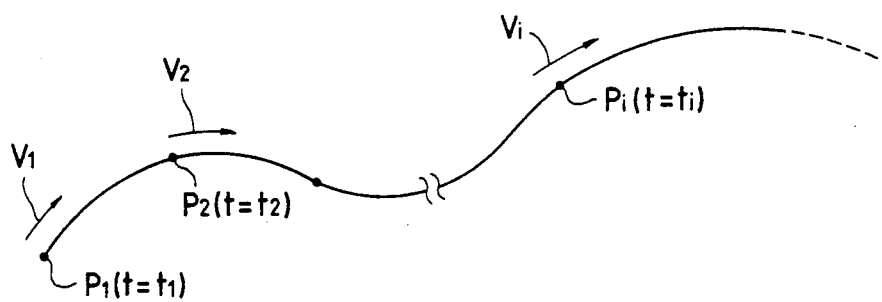
FIG. 9
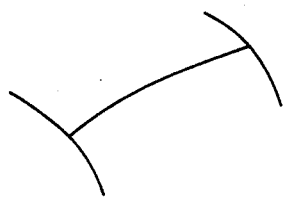
FIG. 10
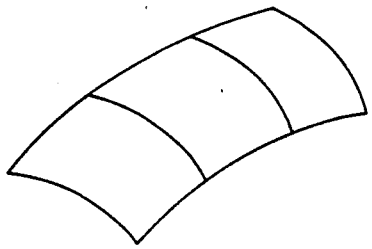

CURVED SURFACE FORMING SYSTEM

BACKGROUND OF THE INVENTION

This invention relates to CAD/CAM systems and automatic programming units, and more particularly to a curve-surface forming system of forming curved surfaces by using curves.

One example of the conventional technology of this type is the curve-surface defining and forming system disclosed by the publication "Kikai Gijutsu (Mechanical Technology) Vol. 35, No. 13" p 105-106, which is as shown in FIG. 1.

In FIG. 1, reference numeral 1 designates a curve inputting means for inputting curves forming a curved surface; 6, a curve consulting means for referring to a curve to obtain data on the curve in a parametric mode; and 5, a curved surface forming means for forming a curve surface by using the data on the curve thus obtained. This system is practiced by an electrical circuit as shown in FIG. 2. In FIG. 2, reference numeral 17 designates an inputting unit comprising a key board, mouse, function keys, etc.; 18, a CPU; 19, a memory unit including memories, magnetic discs, etc.; and 20, an outputting unit including a CRT, puncher, printer, plotter, etc.

The operation of the system will be described. As a premise for description, the term "curve definition direction" as used herein is intended to mean the direction in which, in referring to a curve in a parametric mode, the curve advances spatially with increasing parameters. In the figures referred to below, the curve definition direction is indicated by the arrow. And it is assumed that in a coordinate system on a curved surface, i.e., in a spherical coordinate system, the positions of points on the curve surface are determined by two curved-surface parameters U and V.

A curved-surface forming procedure shown in FIG. 3 will be described with reference to FIG. 4. In FIG. 4, reference characters $A_1$, $A_2$, $B_1$ and $B_2$ designate parametric curves. First, the curves are inputted using the curve inputting means, and each curve is consulted in the curve definition direction by the curve consulting means 6, so that a curved surface is formed by the curve surface forming means 5 using the curve line data obtained through the consultation.

As is apparent from the above description, in the conventional method, the curves forming the curved surface must be defined in the same direction as the curved-surface parameters U and V as shown in FIG. 4. Therefore, in defining a curved surface, the curves must be inputted in accordance with the rule of curve definition direction which intuitively is difficult to understand. If an error is made with the curve definition direction, then the aimed curved surface will not be formed at all.

SUMMARY OF THE INVENTION

An object of this invention is to eliminate the above-described difficulties accompanying a conventional curved surface forming system. More specifically, an object of the invention is to provide a curved surface forming system which can form a curved surface even when the curve definition direction is not coincided with the curved-surface parameter direction.

The foregoing object of the invention has been achieved by the provision of a curved surface forming system for forming a curved surface which is made up of a plurality of curves and represented by two curved surface parameters, which, according to the invention comprises: inputting means for inputting the plurality of curves forming the curved surface; judging means for judging whether or not, in each of the curves, the definition direction thereof coincides with the parameter direction of the curved surface; data storing means for storing, when the definition direction is opposite to the parameter direction of the curved surface, reverse direction data provided for the curve; curve consulting means for consulting, when, in reference to each curve, the reverse direction data has been provided for the curve, the curve in the opposite direction; and curved-surface forming means for forming a curved surface by using the data of the curves thus consulted.

In the curved-surface forming system according to the invention, the curve-definition-direction judging means determines whether the definition direction of each curve coincides with the parameter direction of the curved surface, and if not, the curve consulting means allows the reference of the curve in the opposite direction.

BRIEF DESCRIPTION OF THE DRAWINGS

FIGS. 8A to 8C is an explanatory diagram showing a data storing format. FIGS. 9 and 10 are explanatory diagrams showing examples of a curved surface to be formed.

DESCRIPTION OF THE PREFERRED EMBODIMENT

Figure 1:
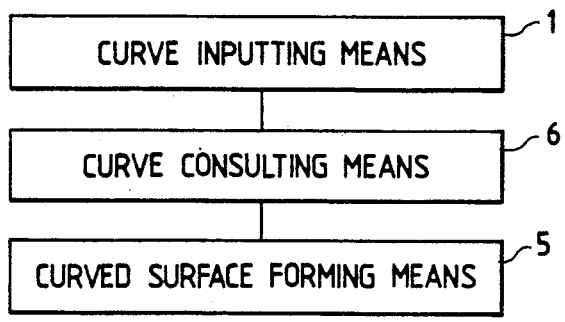
FIG. 1 is a block diagram showing a conventional curved-surface forming system.
Figure 2:
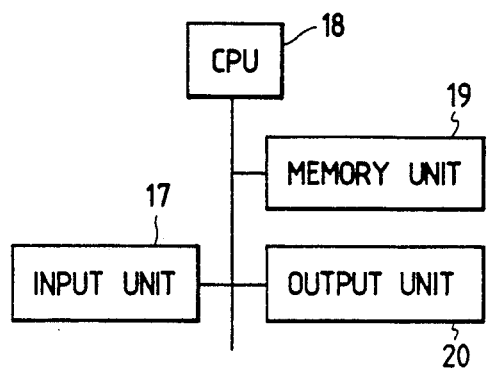
FIG. 2 is a block diagram showing the arrangement of an apparatus for practicing the system of the invention and the conventional system.
Figure 6:
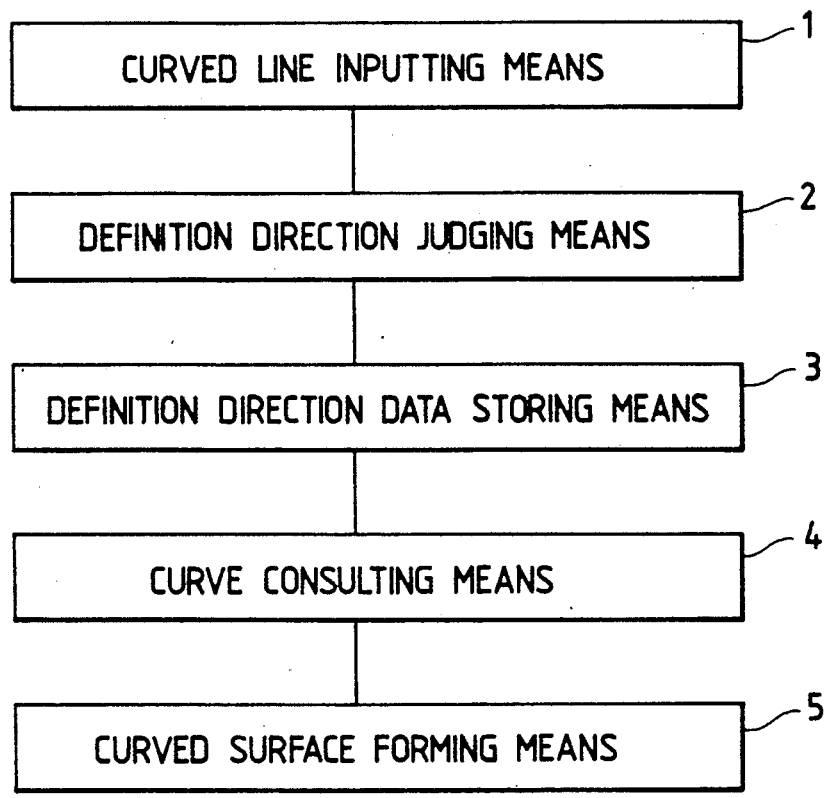
FIG. 6 is a block diagram for a description of one example of a curved-surface forming system according to this invention.

One example of a curved surface forming system according to this invention will be described with reference to FIG. 6. In FIG. 6, reference numeral 1 designates a curve inputting means for inputting curves forming a curved surface; 2, a judging means for determining whether or not curve definition directions are the same as curved-surface parameter directions; 3, a data storing means for storing, when the defining direction of a curve is opposite to the parameter direction of the curved surface, reverse direction data together with the data of the curve; 4, a curve consulting means for consulting, when the reverse direction data is added to a curve, the curve in the opposite direction; and 5, a curved surface forming means for forming a curved surface using the curve data referred to by the curve consulting means 4. Similarly as in the conventional curved surface forming system described above, these means are practiced by the electrical apparatus as shown in FIG. 2.

Figure 3:
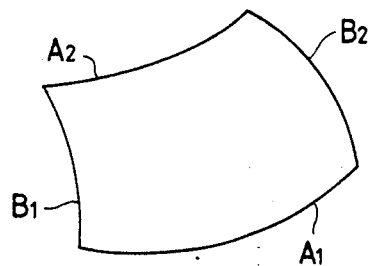
FIGS. 3 through 5 are explanatory diagrams showing curved surfaces to be formed.
Figure 4:
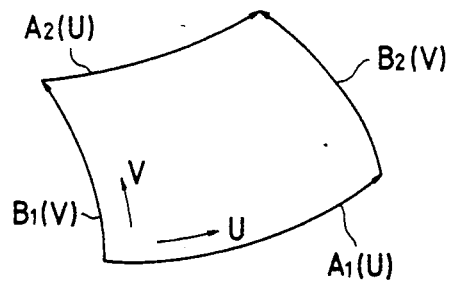
Figure 5:
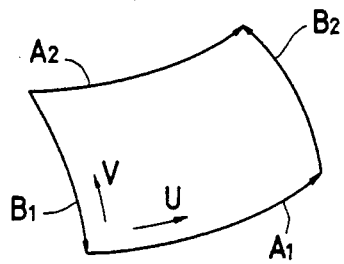

The operation of the curved surface forming system thus organized will be described. In forming a curved surface as shown in FIG. 3, in practice curves extended as shown in FIG. 5 are inputted.

Figure 7A:
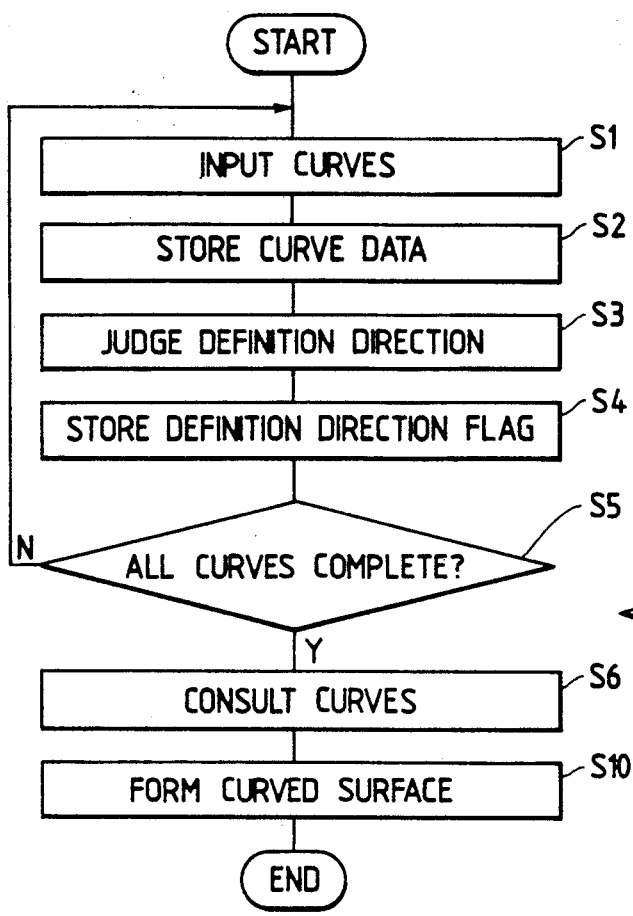
FIGS. 7A to 7C are a flow chart for a description of the operation of the system according to the invention.
Figure 7C:
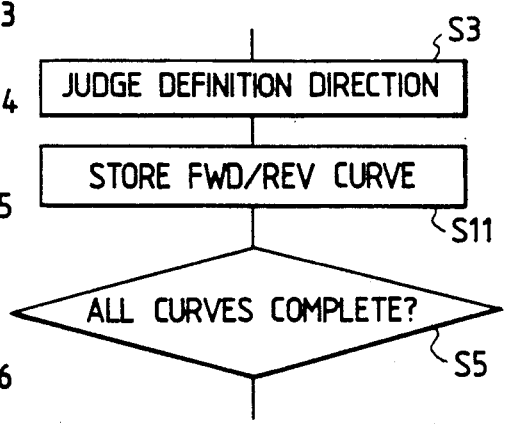
Figure 7B:
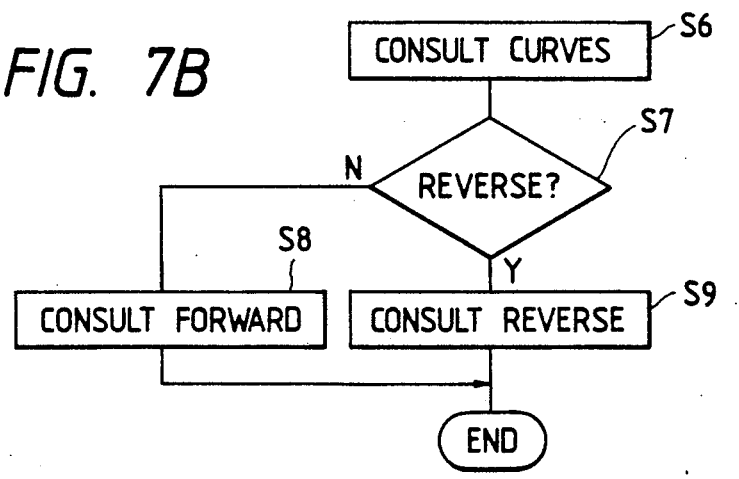

More specifically, the curves $A_1$, $A_2$, $B_1$ and $B_2$ are inputted in the stated order according to a flow chart of FIG. 7 (Step S1). Then, the curve data are stored in a table as shown in FIG. 8 (Step S2). As a manner of the inputting the curves, for example, the case of inputting a train of passing points will be described. Regarding the curve $A_1$, if the train of passing points $(P_1, P_2, \ldots, P_i \ldots)$ having the values of X, Y and Z are inputted successively, these data are stored in the curve data $A_1$ of FIG. 8(a), specifically, in the item of the passing points of FIG. 8(b), successively.

After the inputting of curves, the tangential vectors $V_i$ at each point $P_i$ and the curve parameter $t_i$ are calculated as preparation for the consulting of the curves. The tangential vectors $V_i$ are calculated as follow, for example.

$$\begin{cases} V_i = \dfrac{P_{i+1} - P_{i-1}}{2} & (i \neq 1) \\ V_1 = P_2 - P_1 & (i = 1) \end{cases}$$

Assuming that the number of points is n, the curve parameter $t_i$ $(0 \leq t_i \leq 1)$ are calculated as follows.

$$\begin{cases} t_i = \dfrac{\sum_{j=2}^{i} \overline{P_{j-1} P_j}}{\sum_{j=2}^{n} \overline{P_{j-1} P_j}} & (i \neq 1) \\ t_1 = 0 \end{cases}$$

The relation of $P_i$, $V_i$ and $t_i$ is shown in FIG. 8(c). And the curve definition directions are detected. For the first curve $A_1$, its definition direction is determined as a forward direction, the direction of the curve $A_1$ being the same as the curved surface parameter direction U (Step S3). Since the forward direction being detected, the forward direction flag is stored in the table in FIG. 8 (Step S4). Next, the curve $A_2$ is inputted similarly as in the case of the curve $A_1$. In detection of the definition direction of the curve (Step S3), the vectors $d[A_1(0.5)]/du$ and $d[A_2(0.5)]/du$ of the tangents at the mid points of the curves $A_1$ and $A_2$ are obtained (U=0.5 being the mid points). And it is determined from the angle formed by the vectors thus obtained whether the vectors are substantially in the same direction or opposite in direction to each other. In this case, the curves $A_1$ and $A_2$ are extended in the same direction, and the forward direction flag is set in the table of FIG. 8 (Step S4).

The curve $B_1$ is inputted in the same manner. The curve $B_1$ is one which connects the start points of the curves $A_1$ and $A_2$. Therefore, the vector $$\overrightarrow{A_1(0) A_2(0)}$$

extended from the curve $A_1$ to the curve $A_2$, and the vector $d[B_1(0.5)]/dV$ of the tangent of the curve $B_1$ at the mid point are subjected to comparison. These vectors being opposite in direction, the reverse direction flag is stored in the table of FIG. 8. The above-described operations are carried out for all the curves (Step S5). Thereafter, the points on the curves are referred to by using the table of FIG. 8 (Step S6). And the forward and reverse direction flags are checked (Step S7). With the forward direction flag, the consultation is made in the curve definition direction (Step S8); and with the reverse direction flag, the consultation is made in the opposite direction (Step S9), to read curve data. As a manner of the consulting of the curve, for example on the case of the curve $A_1$, that is, when the parameter t is provided, the manner of obtaining the corresponding points P on the curve $A_1$ will be described. A parameter section between $t_i$ and $t_{i=1}$ including t $(t_i \leq t \leq t_{i+1})$ is obtained from FIG. 8(b). In the section, portion parameters t are obtained as follow.

$$t^* = \frac{t - t_i}{t_{i+1} - t_i}$$

By using the tertiary Hermite interpolation the points are calculated as follows.

$$P = h_{1(t)} \cdot P_i + h_{2(t)} \cdot P_{i+1} + h_{3(t)} \cdot V_i + h_{4(t)} \cdot V_{i+1}$$

Where
$h_{1(t)} = 2t^3 - 3t^2 + 1$
$h_{2(t)} = -2t^3 + 3t^2$
$h_{3(t)} = t^3 - 2t^2 + t$
$h_{4(t)} = t^3 - t^2$ In the case of reverse direction, the above described processing are performed by replacing t to $1-t$. $(t=1-t)$ As a result, it is possible to consult the points on the curved surface forming by the form of $P=A_1(t)$ independent to the definition direction of the curve. Linear interpolation, B-spline interpolation or the like may by used to obtain the points P, but the suitable preparation data for each interpolation method s required. The curve data thus read are used to form a curved surface (Step S10). A manner of the curved surface forming will be described with reference to FIG. 5. By the processing of consulting of the curve the points on the curve are able to consult as $A_1(t)$, for example. For that reason, for example, points P on the curved surface are formed as the Coons surface patch from the curved surface parameter U.V. as follow.

$$P = [A_{1(u)} \ A_{2(u)}] \begin{bmatrix} \Psi_{(v)} \\ 1 - \Psi_{(v)} \end{bmatrix} + [\Psi_{(u)} \ 1 - \Psi_{(u)}] \begin{bmatrix} B_{1(v)} \\ B_{2(v)} \end{bmatrix} -$$

$$[\Psi_{(u)} \ 1 - \Psi_{(u)}] \begin{bmatrix} A_{1(0)} & B_{1(1)} \\ B_{2(0)} & B_{2(1)} \end{bmatrix} \begin{bmatrix} \Psi_{(v)} \\ 1 - \Psi_{(v)} \end{bmatrix}$$

where $\Psi$ is blending function which is obtains as follow for example. $\Psi_{(t)} = 2t^3 - 3t^2 + 1$.

FIG. 7C shows a Step S11 which is effected instead of Step S4 in FIG. 7A. That is, it is determined whether or not the curve definition direction is forward or reverse (Step S3), and if it is forward the curve data are stored by taking them in the curve definition direction, and if it reverse, the curve data are stored by taking them in the opposite direction (Step S11). In the following curve consultation, similarly as in the above-described conventional system, the curves stored are referred to as they are, with the same effect as that in the above-described embodiment.

In the above described embodiment, four curves are used to form a curved surface. However, the technical concept of the invention can be equally applied to the case where a curved surface is formed using less than or more than four curves as shown in FIG. 9 or 10.

In the apparatus for practicing the system as shown in FIG. 2, the outputting unit 20 may be replaced by an NC device for applying control instructions to a drive unit for a numerically controlled machine.

As was described above, in the system of the invention, it is determined whether or not the curve definition direction coincides with the curved surface parameter direction, and if not, the curve consulting means is operated so that the reference of the curve is made in the direction opposite to the curve definition direction. Therefore, with the system, curves forming a curved surface can be inputted independently of their definition directions, with the result that the curved surface defining efficiency is greatly improved.

What is claimed is:

1. A curved surface forming system for forming a curved surface which is constituted by a plurality of curves and represented by two curved surface parameters, said system comprising:
    inputting means for inputting said plurality of curves forming said curved surface;
    judging means for determining whether or not a definition direction thereof coincides with a parameter direction of said curved surface in each of said curves;
    data storing means for storing a curve data including a direction data representing said definition direction;
    curve consulting means for consulting said curves;
    curved surface forming means for forming a curved surface by using the data of said curved thus consulted.

2. The system as claimed in claim 1, wherein said consulting step comprising the steps of:
    consulting said curves in definition direction when said definition direction coincides with the parameter direction of said curved surface;
    consulting said curves in a direction opposite to the definition direction, when said definition direction is opposite to the parameter direction of said curved surface.

3. The system as claimed in claim 1, wherein said consulting step comprising the steps of:
    storing the curve data in the curve definition direction, if the curve definition direction is coincides with the parameter direction of said curved surface;
    storing the curve data in a direction opposite to the curve definition direction, if the curve definition direction is opposite to the parameter direction of said curved surface.

4. A curved surface forming method for forming a curved surface which is constituted by a plurality of curves and represented by two curved surface parameters, said method comprising the steps of:
    inputting said plurality of curves forming said curved surface;
    determining whether or not, in each of said curves, a definition direction thereof coincides with a parameter direction of said curved surface;
    storing a curve data including a direction data of said curves representing said definition direction;
    consulting said curve;
    forming a curved surface using the curve data which is obtained by said consulting.

5. The method as claimed in claim 4, wherein said storing step comprises the steps of:
    storing the curve data in the curve definition direction, if the curve definition direction is coincides with the parameter direction of said curved surface;
    storing the curve data in a direction opposite to the curve definition direction, if the curve definition direction is opposite to the parameter direction of said curved surface.

6. The method as claimed in claim 4, wherein said determining step including the steps of:
    obtaining vectors of tangents at mid points of the curves in each of said curves;
    obtaining an angle formed by the vectors;
    determining whether the vector are substantially in the same direction or opposite in direction to each other.

* * * * *